(12) United States Patent
Balmakhtar et al.

(10) Patent No.: US 10,171,450 B1
(45) Date of Patent: *Jan. 1, 2019

(54) GLOBAL TIME BASED AUTHENTICATION OF CLIENT DEVICES

(71) Applicant: Sprint Communications Company L.P., Overland Park, KS (US)

(72) Inventors: Marouane Balmakhtar, Alexandria, VA (US); Ramana Venkata Gollamudi, Oak Hill, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,213

(22) Filed: Jan. 9, 2018

Related U.S. Application Data (63) Continuation of application No. 14/446,732, filed on Jul. 30, 2014, now Pat. No. 9,887,980.

(51) Int. Cl.
*H04L 29/06* (2006.01)

(52) U.S. Cl.
CPC .......... *H04L 63/0815* (2013.01); *H04L 63/10* (2013.01)

(58) Field of Classification Search
CPC ............................ H04L 63/0815; H04L 63/10
See application file for complete search history.

(56) References Cited

U.S. PATENT DOCUMENTS

| | | | |
|---|---|---|---|
| 6,961,857 B1 * | 11/2005 | Floryanzia | ............ H04L 63/083 713/168 |
| 7,620,978 B1 | 11/2009 | Reddy et al. | |
| 8,108,920 B2 * | 1/2012 | Spelman | ................. G06F 21/33 726/20 |
| 8,515,434 B1 * | 8/2013 | Narendran | ............ H04W 48/02 370/230 |
| 2005/0074126 A1 | 4/2005 | Stanko | |
| 2005/0085259 A1 | 4/2005 | Conner et al. | |
| 2012/0127975 A1 | 5/2012 | Yang et al. | |
| (Continued) | | | |

OTHER PUBLICATIONS

Final Office Action dated Nov. 2, 2016 in U.S. Appl. No. 14/446,732, 27 pages.

(Continued)

*Primary Examiner* — Ghodrat Jamshidi (57) ABSTRACT

A system for authenticating client devices for communication with one or more wireless communications networks, includes a client device configured to receive a client-side global time from a time tracking system and generate a response to an authentication challenge based on the authentication challenge, the client-side global time, a client device identifier associated with the client device, and optionally location data that corresponds to a location of the client device. The system further includes a security gateway configured to receive a gateway-side global time from the time tracking system, generate an expected response to the authentication challenge based on the authentication challenge, the gateway-side global time, the client device identifier, and optionally location data that corresponds to an expected location of the client device, receive the response to the authentication challenge, and authenticate the client device on a wireless communications network based on the response and the expected response.

20 Claims, 5 Drawing Sheets

(56) References Cited

U.S. PATENT DOCUMENTS

| | | | | |
|---|---|---|---|---|
| 2013/0005443 A1* | 1/2013 | Kosta | ................... | G07F 17/3206 |
| | | | | 463/25 |
| 2013/0014237 A1* | 1/2013 | Krogh | ..................... | G06F 21/31 |
| | | | | 726/6 |
| 2013/0132487 A1* | 5/2013 | Zhao | ..................... | H04L 67/141 |
| | | | | 709/206 |
| 2013/0173484 A1* | 7/2013 | Wesby | ................... | G06Q 30/06 |
| | | | | 705/318 |
| 2014/0250512 A1* | 9/2014 | Goldstone | ............. | G06F 21/313 |
| | | | | 726/6 |
| 2014/0282974 A1* | 9/2014 | Maher | ..................... | H04L 63/08 |
| | | | | 726/7 |

OTHER PUBLICATIONS

First Action Interview Office Action and Applicant-Initiated Interview Summary dated Apr. 7, 2016 in U.S. Appl. No. 14/446,732, 6 pages.
First Action Interview Pilot Program Pre-Interview Communication dated Jan. 21, 2016 in U.S. Appl. No. 14/446,732, 3 pages.
Non-Final Office Action dated Apr. 10, 2017 in U.S. Appl. No. 14/446,732, 29 pages.
Notice of Allowance dated Sep. 29, 2017 in U.S. Appl. No. 14/446,732, 13 pages.

* cited by examiner

GLOBAL TIME BASED AUTHENTICATION OF CLIENT DEVICES

CROSS-REFERENCE TO RELATED APPLICATIONS

This application is a continuation of U.S. application Ser. No. 14/446,732, filed Jul. 30, 2014, entitled "Global Time Based Authentication of Client Devices". The aforementioned application is hereby incorporated by reference herein in its entirety.

SUMMARY

The present disclosure is directed, in part, to global time based authentication of client devices, substantially as shown in and/or described in connection with at least one of the figures, and as set forth more completely in the claims.

In certain aspects, the present disclosure relates to authentication of client devices on a secured network, such as a wireless communications network. The secured network may comprise a security gateway that is configured to provide an authentication challenge to the client device. The client device may generate at least one response to the authentication challenge and provide the at least one response to the security gateway. The security gateway may generate at least one expected response to the authentication challenge and may authenticate the client device by comparing the at least one expected response to the at least one response provided by the client device. For example, the security gateway may authenticate the client device based on determining that the at least one expected response matches the at least one response.

In certain respects, the present disclosure provides for global time based authentication of client devices. A response to an authentication challenge can be generated utilizing a client-side global time that is received by a client device from a time tracking system, and an expected response to the authentication challenge can be generated utilizing a gateway-side global time that is received by a security gateway from the time tracking system.

Also in certain respects, the present disclosure provides for location based authentication of client devices. A response to an authentication challenge can be generated utilizing location data that corresponds to a location of the client device, and an expected response to the authentication challenge can be generated utilizing expected location data that corresponds to an expected location of the client device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
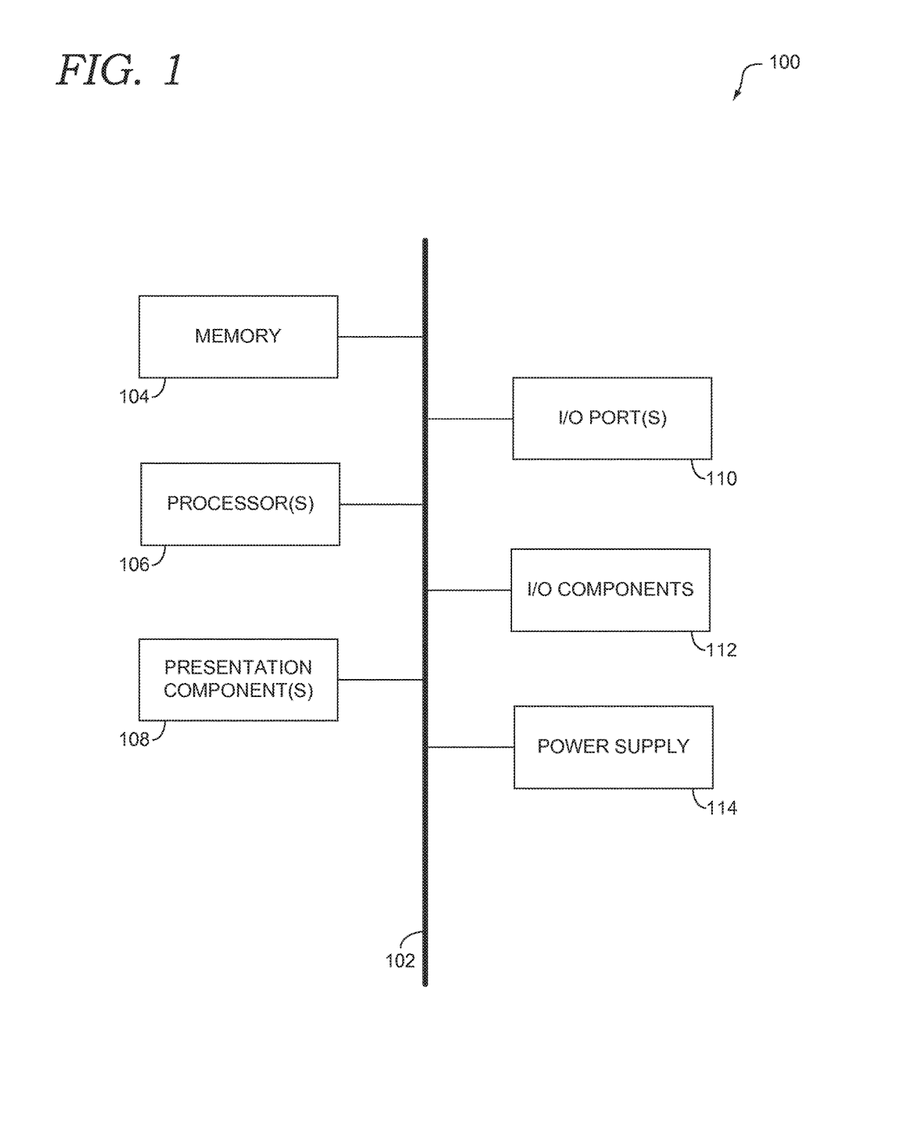
FIG. 1 depicts a diagram of an exemplary computing environment suitable for use in implementations of the present disclosure.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
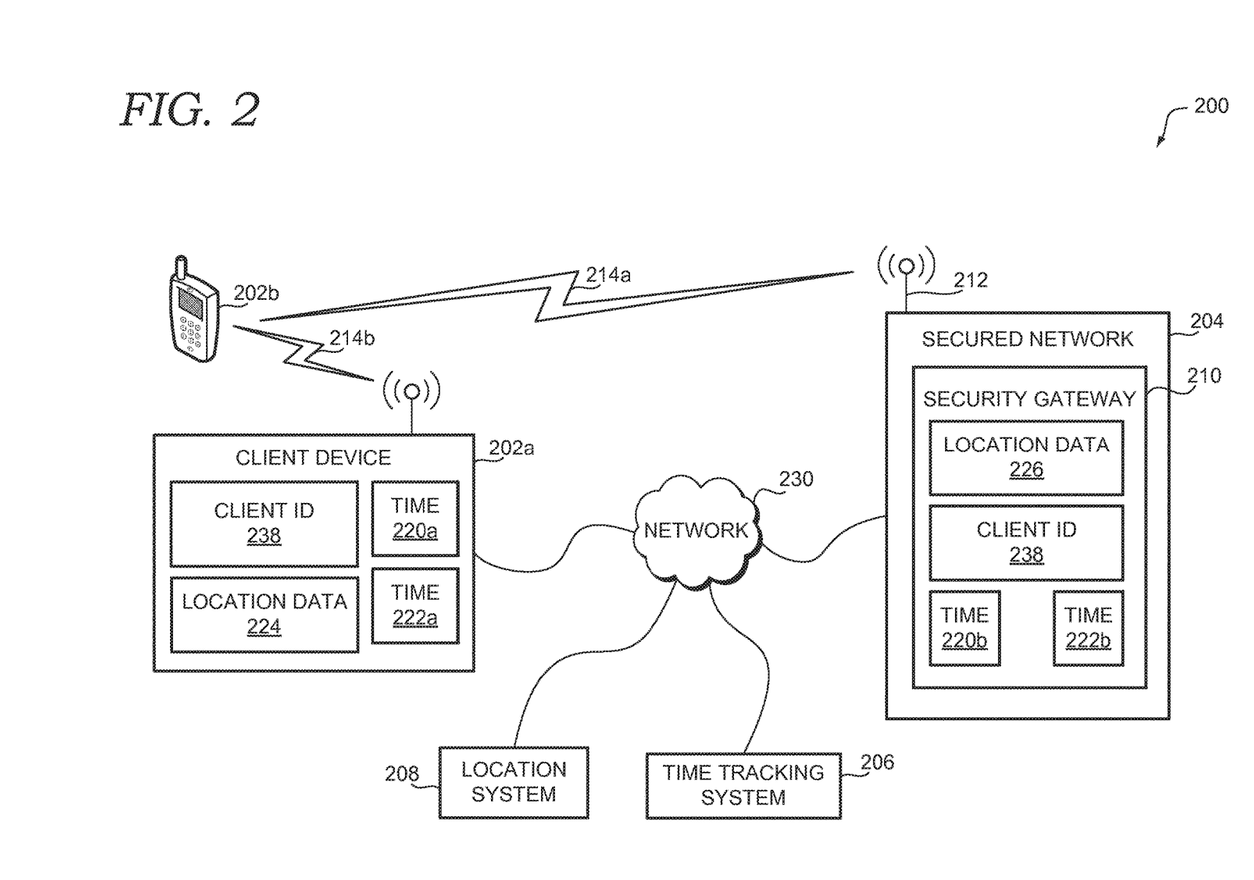
FIG. 2 illustrates an exemplary system in which implementations of the present disclosure may be employed.

Referring now to FIG. 2, an exemplary system, generally referred to herein as system 200, is illustrated in which implementations of the present disclosure may be employed. In particular, system 200 may be utilized for authenticating client devices for communication with one or more wireless communications networks, in accordance with implementations of the present disclosure. It should be understood that this and other arrangements described herein are set forth only as examples. Other arrangements and elements (e.g., machines, interfaces, functions, orders, and groupings of functions) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among the components of system 200, system 200 includes client device 202a, user device 202b, secured network 204, time tracking system 206, location system 208, and security gateway 210, which can be communicatively coupled to one another through network 230.

Network 230 may be wired, wireless, or both. Network 230 may include multiple networks, or a network of networks, but is shown in FIG. 2 in simple form so as not to obscure other aspects of the present disclosure. By way of example, network 230 can include one or more wide area networks (WANs), one or more local area networks (LANs), one or more public networks, such as the Internet, and/or one or more private networks. Where network 230 includes a wireless communications network, such as a wireless telecommunications network, components such as a base station, a communications tower, or even access points (as well as other components) may provide wireless connectivity. Although certain components are illustrated for the sake of clarity, network 230 may enable communication between any number of devices and components. Networking environments are commonplace in offices, enterprise-wide computer networks, intranets, and the Internet. Accordingly, network 230 is not described in significant detail.

While client device 202a, user device 202b, secured network 204, time tracking system 206, and location system 208 are shown as each being communicatively coupled to one another through network 230, in various implementations, communication between any of the various components of system 200 may be facilitated by separate networks, any of which can be similar to network 230. For example, time tracking system 206 and/or location system 208 may be communicatively coupled to any of the various components shown in system 200 utilizing one or more dedicated networks.

In system 200, similar to network 230, secured network 204 may be wired, wireless, or both. In the implementation shown, secured network 204 comprises a wireless communications network, such as a wireless telecommunications network, by way of example. Thus, secured network 204 can comprise components such as a base station, a communications tower, or even access points to provide wireless connectivity. Although in FIG. 2 secured network 204 is shown as being separate from network 230, in some implementations, secured network 204 may be a part of network 230.

In the present implementation, client device 202a is a small cell, which, for exemplary purposes only, may include a femtocell, a picocell, a microcell, a macrocell, a low-cost internet base station (LCIB), or the like. However, in various implementations, client device 202a is generally any computing device that is capable of accessing secured network 204, for instance, computing device 100 of FIG. 1. As such, client device 202a might take on a variety of forms, such as a personal computer (PC), a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

System 200 is also shown as including user device 202b, which in the present implementation is a cellular device, such as a mobile phone. More generally, user device 202b can take any of the various forms described with respect to client device 202a. In various implementations, user device 202b is optional, and is provided to illustrate implementations where a device is capable of accessing secured network 204 through client device 202a. While implementations may be described with respect to authentication of client device 202a, the authentication may additionally or instead be for user device 202b. In this respect, user device 202b can also be referred to as a client device herein.

In the implementation shown, user device 202b is capable of communicating with secured network 204 through client device 202a, but also can optionally communicate with secured network 204 directly or through devices other than client device 202a. For example, user device 202b may communicate with secured network 204 over air interface 214a through base station 212 (e.g., a cellular base station), and/or over air interface 214b through at least client device 202a.

Communication links between user device 202b and secured network 204 that are facilitated by air interfaces 214a and 214b may be active concurrently, or at different times, depending on various factors, such as an operational state of user device 202b, a physical location of user device 202b with respect to base station 212 and/or client device 202a, the type of communication session user device 202b seeks or is engaged in with secured network 204, and signal strength available for air interfaces 214a and 214b. While shown as air interfaces, in various implementations, either of the communication links may be wired.

Secured networks, such as secured network 204, continue to rapidly grow, both in terms of prevalence and scope, as platforms for providing network services to users. Devices, such as client devices 202a and/or user device 202b can be configured to access secured network 204 so as to utilize the network services. In doing so, it is often desirable to employ security measures to authenticate the client devices and/or users of the client devices on the secured network. For example, the security measures may be in place to prevent unauthorized devices or users from obtaining access to network services or sensitive data.

In this regard, system 200 can be utilized for authenticating client device 202a and/or user device 202b for communication with secured network 204. For example, secured network 204 comprises security gateway 210 (e.g. SecGW), which is configured to authenticate client devices for communication with secured network 204.

Security gateways, such as security gateway 210 can readily be situated in secure locations. However, devices, such as client device 202a and/or user device 202b may be situated in less secure locations. For example, where a client device (e.g. client device 202a) is a small cell, such as a femtocell, the small cell may be deployed in various public or private venues, where it may be vulnerable to tampering by unauthorized parties. As one example, the client device may be replaced with an unauthorized device that attempts to spoof the client device. As the client devices might have a small form factor, they may be easily relocated without authorization. Small cells are being embraced by service providers to increase capacity and provide or enhance coverage to non-hot spot areas. These devices are typically cheaper than alternatives so more can be deployed. It is therefore desirable to provide for effective authentication for client devices, such as small cells.

Aspects of the present disclosure can be utilized to provide enhanced security measures to client devices, such as small cells. However, the scope of the present disclosure is not limited to small cells, or by any of the various security concerns associated with small cells or other client devices described herein. Furthermore, while aspects of the present disclosure relate to authentication of client devices, it is noted that the present disclosure more generally concerns authentication of client devices and/or users of client devices.

In various implementations, system 200 can be configured to provide authentication to one or more client devices and/or one or more users for secured network 204 utilizing global time and/or location data. Global time can be provided, for example, by a time tracking system, such as time tracking system 206. Client device 202a is configured to receive global time (e.g. global time samples) from time tracking system 206. FIG. 2 shows client device 202a having global times 220a and 222a, which have been sampled from time tracking system 206 at different times. Security gateway 210 is also configured to receive global time (e.g. global time samples) from time tracking system 206. As shown, security gateway 210 includes global times 220b and 222b, which have been sampled from time tracking system 206 at different times.

Time tracking system 206 generally comprises any suitable time tracking system from which client device 202a and security gateway 210 may receive synchronized global time. By way of example, time tracking system 206 can comprise a GPS system, which provides GPS time to client device 202a and security gateway 210. In such implementations, time tracking system 206 and location system 208 can optionally correspond to the GPS system. As another example, time tracking system 206 can comprise a network time server. For example, network time protocol (NTP) may be utilized to facilitate synchronized global times. It is noted that a discrete and external time server may not be required. For example, synchronized global time can be provided for utilizing various peer-to-peer approaches between client device 202a and security gateway 210. Many approaches are available and contemplated as being suitable for providing synchronized global time samples to client device 202a and security gateway 210.

In implementations that employ location data, the location data can be provided, for example, by a location system, such as location system 208. Client device 202a is configured to receive location data from location system 208. FIG. 2 shows client device 202a having location data 224, which has been sampled from location system 208. Location data 224 corresponds to a location of client device 202a. In some implementations, location data 224 comprises or otherwise corresponds to location coordinates, such as a longitude and latitude. Location data 224 can be from a GPS system, such as a GPS system that may also optionally provide global times 220a, 222a, 220a, and 220b. In this regard, location data 224 may comprise GPS coordinates. In addition to, or instead of the foregoing, location data 224 may comprise orientation data, which may be provided by a gyroscope within client device 202a. In particular, a GPS system is but one example of a means for providing for location data 224. Another example could employ a gyroscope and accelerometer. While location system 208 is shown as being external to client device 202a, at least portions thereof may be within client device 202a.

Whereas location data 224 corresponds to a location of client device 202a, expected location data 226, which is provided to security gateway 210, can correspond to an expected location of client device 202a. Expected location data 226 can be generated and/or provided to security gateway 210 prior to location data 224 being generated and/or provided to client device 202a. For example, expected location data 226 may be generated and/or provided to security gateway 210 prior to initiating authentication of client device 202a. In contrast, location data 224 may be generated and/or provided to client device 202a during authentication (as a part of authentication) of client device 202a for secured network 204. Expected location data 226 can be provided to security gateway 210 from client device 202a, location system 208, (e.g., through network 230) or by other means, such as by being manually entered by a user. In some implementations, expected location data 226 is provided as part of an installation process for client device 202a.

Figure 3:
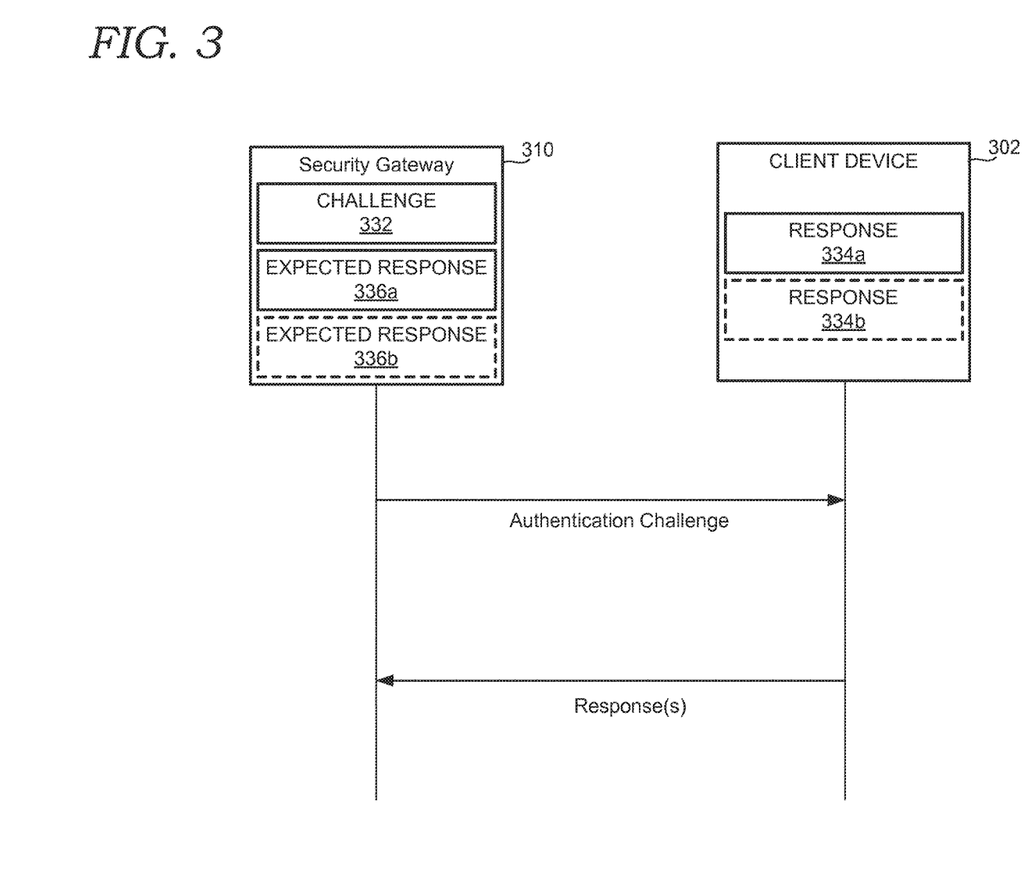
FIG. 3 illustrates an exemplary authentication of a client device for communication with a wireless communications network, in accordance with implementations of the present disclosure.

The global time and/or location data may be incorporated into an authentication challenge/response model for authenticating client devices and/or users. Referring now to FIG. 3, an exemplary authentication of a client device is illustrated, such as client device 302, for communication with a wireless communications network, in accordance with implementations of the present disclosure. Throughout the following description of FIG. 3, various components and other items from FIG. 2 will be referenced to provide a thorough explanation of implementations of the disclosure. Client device 302 may correspond to client device 202a and/or user device 202b in FIG. 2. An exemplary authentication challenge/response model is described below, followed by a description of how global time and/or location data may be incorporated into an authentication challenge/response model.

In the authentication challenge/response model, a client device, such as client device 302, receives an authentication challenge (e.g. a challenge string) from a security gateway, such as security gateway 310, which can correspond to security gateway 210 in FIG. 2. As shown, security gateway 310 provides authentication challenge 332 to client device 302. In turn, client device 302 receives authentication challenge 332 from security gateway 310. An authentication challenge may optionally be generated or otherwise based on random data or dynamic data that varies between authentication challenges and/or authentication sessions and optionally static data or non-dynamic data that is utilized in each or multiple authentication challenges and/or authentication sessions.

Static data may correspond to data that does not change between authentication challenges and/or authentication sessions. Non-dynamic data may correspond to data that can change between authentication challenges and/or authentication sessions, but any change typically occurs after many authentication challenges are generated and/or authentication sessions are completed. Due to the random data or dynamic data, each authentication challenge may be unique.

Client device 202a can generate at least one response based on the authentication challenge and optionally static data and/or non-dynamic data. For example, client device 202a can generate at least one response 334a to authentication challenge 332 and optionally response 334b to authentication challenge 332 (and possibly other responses to the authentication challenge). In some implementations, the at least one response is based on at least the authentication challenge and a client identifier (ID). The client ID can be associated with the client device and/or a user being authenticated. For example, where client device 302 corresponds to client device 202a in FIG. 2, response 334a and 334b may each be based on at least client ID 238 and authentication challenge 332. As an example, client device 302 may hash authentication challenge 332 with a passkey comprising client ID 238 or a combination of client ID with other data.

A client ID may correspond to static data, such as a unique identifier that identifies a client device and/or a user amongst other client devices and/or users that may be authenticated in system 200. For example, user device 202b may have a different client ID than client device 202a. An exemplary suitable client ID associated with a client device may comprise a burned-in identifier, such as a media access control (MAC) address of a client device. For example, client ID 238 can be a MAC address of client device 202a. In this respect, a client ID can correspond to static data in that each response to an authentication challenge generated by client device 302 may be based on the client ID. A client ID can instead correspond to non-dynamic data, such as a device and/or user code, which can be configured during installation of the client device and/or account setup of a user, but may change periodically.

As shown in FIG. 3, client device 302 provides response 334a and/or 334b to security gateway 310. Security gateway 310 receives response 334a and/or 334b to authentication challenge 332. In implementations where security gateway 310 receives multiple responses to an authentication challenge for a common authentication session, any combination of the multiple responses may be received from a common transmission to other responses, or may be received from a separate transmission. As one example, responses 334a and 334b may be sent concurrently from client device 302 and may be received concurrently by security gateway 310.

Security gateway 310 may authenticate client device 302 based on at least one of the received responses. In particular, security gateway 310 may authenticate client device 302 based on at least one response to the authentication challenge and at least one expected response to the authentication challenge. As shown, security gateway 310 comprises expected response 336a to authentication challenge 332 and optionally at least one other expected response to authentication challenge 332, such as expected response 336b. Authenticating may be based on comparisons between, for example, response 334a and/or 334b with expected response 336a and/or 336b. In some implementations, client device 302 may be authenticated based on a match or other comparison between at least one response and at least one expected response. For example, client device 302 may be authenticated where security gateway 310 determines that response 334a matches at least one of expected responses 336a and 336b or where response 334b matches at least one of expected responses 336a and 336b.

An expected response to an authentication challenge can correspond to a response that would be expected to be received from a client device that should validly be authenticated for communication with secured network 204. Therefore, an expected response may be generated in substantially the same manner as a response, such that the same input(s) to a function for generating the expected response or for generating the response would result in the same output.

Expected responses can be generated by security gateway 310 based on similar data as utilized by client device 302 to generate responses (e.g. the authentication challenge, static data, and/or non-dynamic data). For example, where responses 334a and/or 334b are each based on authentication challenge 332 and client ID 238, expected responses 336a and/or 336b can be based on authentication challenge 332 and client ID 238. Thus, as shown in FIG. 2, security gateway 210 also comprises client ID 238, which may have been provided to secured network 204 prior to the authentication session, which may be part of an installation process for client device 202a.

Thus, in some implementations, one or more responses and expected responses can be generated based on an authentication challenge and static and/or non-dynamic data, examples of which have been provided above. However, one or more responses and expected responses can also be generated based on an authentication challenge and variable data, in addition to or instead static and/or non-dynamic data. Variable data can correspond to data that may have any of a plurality of predictable values in an authentication challenge and/or authentication session.

Variable data can result in multiple possible responses to a single authentication challenge from a client device. It may be desirable to allow for authentication of the client device, even where there are multiple possible responses to a single authentication challenge. In one respect, a client device may generate and provide multiple different responses to a single authentication challenge. One or both of the multiple responses may match an expected response, resulting in authentication. In this case, the security gateway may comprise one or more expected responses. For example, where one expected response is employed, if the responses encompass all possible valid responses, at least one would match the expected response. In another respect, a security gateway may generate multiple valid expected responses to a single authentication challenge. One or both of the multiple expected responses may match a response, resulting in authentication. In this case, a client device may provide one or more possible responses to the security gateway. For example, where one response is employed, if the expected responses encompass all possible valid responses, at least one would match the response.

Thus, with respect to FIG. 3, while response 334a may not match expected response 336a, client device 302 may still be authenticated based on response 334a matching expected response 336b. As another example, where both response 334a and 334b are provided by client device 302, response 334a may not match any expected response, but client device 302 may still be authenticated where response 334b matches at least one expected response.

It will therefore be appreciated that any number and combination of expected responses and responses may be employed in various implementations of the present disclosure. Utilizing such approaches can be advantageous in providing authentication in cases where responses and/or expected responses for a given authentication session have an aspect of variability. In doing so, a client device may be still be successfully authenticated despite the variability. However, it should be noted that the present disclosure allows for authenticating a client device utilizing one response and one expected response.

After being authenticated, client device 302 can communicate with secured network 204 as an authenticated client device. While FIG. 3 has been described with respect to authentication of a client device, similar approaches may be employed in authenticating a user (e.g., a user account). For example, at least some of the data utilized in generating a response may be provided by the user and/or associated with the user account, such as a user ID and user code. A user ID may be similar to a client ID described above. It will therefore be appreciated that while certain aspects are described herein with respect to authentication of a client device, they may also be applicable to authentication of a user. These aspects can include location data and global time.

With respect to global time, in certain aspects of the present disclosure, an authentication session may comprise a client device receiving at least one client-side global time from a time tracking system. In the authentication session described above with respect to FIG. 3, client device 302 may receive, for example, global time 220a and/or global time 222a from time tracking system 206. The global time(s) may generally be received at any point during the authentication session prior to generating response 334a and/or response 334b.

An authentication session may further comprise a security gateway receiving at least one gateway-side global time from the time tracking system. In the authentication session described above with respect to FIG. 3, security gateway 310 may receive, for example, global time 220b and/or global time 222b from time tracking system 206. The global time(s) may generally be received at any point during the authentication session prior to generating expected response 336a and/or expected response 336b.

Global time 220a is substantially synchronized with global time 220b. Furthermore, global time 222a is substantially synchronized with global time 222b. As indicated above, any suitable synchronization techniques may be employed. In some implementations, only global times 220a and 220b are employed. However, additional global times, such as global times 222a and 222b may be utilized, for example, to overcome synchronization discrepancies between client-side and gateway-side global times. This will later be described in additional detail.

An authentication session may comprise generating a response to an authentication challenge based on the authentication challenge, a client-side global time, and optionally any other data, such as any of the various types of data described above, including a client device identifier. For example, the authentication challenge can be hashed with, or otherwise combined with a passkey comprising a combination of the client-side global time and/or other data. Where a passkey is employed, a client device may combine any of the various constituents thereof in order to form the passkey. Thus, in the authentication session described above with respect to FIG. 3, client device 302 can generate response 334a based on authentication challenge 332, global time 220a, and client ID 238, by way of example. Client device 302 can also generate response 334b based on authentication challenge 332, global time 222a, and client ID 238.

An authentication session may also comprise generating an expected response to an authentication challenge based on the authentication challenge, a gateway-side global time, and optionally any other data, such as any of the various types of data described above, including a client device identifier. For example, the authentication challenge can be hashed with, or otherwise combined with a passkey comprising a combination of the gateway-side global time and/or other data. Where a passkey is employed, a security gateway may combine any of the various constituents thereof in order to form the passkey. Thus, in the authentication session described above with respect to FIG. 3, security gateway 310 can generate expected response 336a based on authentication challenge 332, global time 220b, and client ID 238, by way of example. Security gateway 310 can also generate expected response 336b based on authentication challenge 332, global time 222b, and client ID 238.

Thus, global time may be employed in the challenge/response model to authenticate a client device. Global time can correspond to random and/or dynamic data that is utilized in generating at least one response and at least one expected response to an authentication challenge. In particular, global time can vary from authentication session to authentication session. In doing so, the authentication sessions can be more secure by being substantially more difficult to decode and/or predict valid responses to authentication challenges. Therefore, it may be more difficult to spoof a client device or otherwise gain unauthorized access to a secured network. Furthermore, this can be accomplished without expensive dedicated hardware. For example, small cells may have access to global time that is already available for other purposes.

As indicated above, synchronized client-side global time and gateway-side global time may still have some synchronization discrepancy. For example, the client-side global time and the gateway-side global time may have a synchronization discrepancy on the order of milliseconds. As a more specific example, the client-side global time could be 9:59:59.9 (hours:minutes:seconds.milliseconds) and due to a synchronization discrepancy, the gateway-side global time could be 10:00:00.0.

The synchronization discrepancy may result in times where a response from a client device does not match an expected response generated by a security gateway. In particular, in generating a response to an authentication challenge and an expected response to an authentication challenge utilizing global time, while client-side and gateway-side global times may be truncated, rounded, or otherwise manipulated to minimize the synchronization discrepancy, there may still be times where the client device does not provide a response that matches an expected response for an authentication challenge.

However, by utilizing multiple possible responses and/or multiple possible expected responses, as described in implementations herein, synchronization discrepancies may be effectively overcome. For example, the global time may correspond to variable data, as described above. In this regard, multiple client-side global times (e.g., 220a and 222a of FIG. 2) may be utilized in generating different responses and/or multiple gateway-side global times (e.g., 220b and 222b) may be utilized in generating different expected responses.

Sampling of the multiple client-side global times may be separated by a predetermined gap time. Furthermore, sampling of the multiple gateway-side global times may be separated by approximately a predetermined gap time. For example, the multiple client-side global times may be separated by 60 seconds and the multiple client-side global times may be separated by 60 seconds. Generally, it may be desirable for a predetermined gap time to be longer than an expected synchronization discrepancy, so as to overcome the synchronization discrepancy.

In some implementations, a security gateway is configured to round one or more gateway-side global times to a predetermined time increment to generate one or more expected responses to an authentication challenge, and a client device is configured to round one or more client-side global times to the predetermined time increment to generate one or more responses to the authentication challenge. For example, the gateway-side and client-side global times may be rounded to a nearest instance of a predetermined time increment, always rounded up to the predetermined time increment, or always rounded down to the predetermined time increment. The predetermined time increment may be an hour (e.g., 9:00 PM, 10:00 PM, 5:00 AM), a quarter hour (e.g., 9:15 PM, 10:45 AM), a half hour (e.g., 9:30 PM, 10:30 AM), or another increment such as five minute increments, ten minute increments, etc.

Generally, where multiple global times are employed in an authentication session, it may be desirable for the predetermined time increment to be greater than a synchronization discrepancy and a predetermined gap time. With respect to multiple client-side global times, one may always be rounded up and one may always be rounded down, both may always be rounded up or down, or both may be rounded to a nearest instance of a predetermined time increment. Similarly, with respect to multiple gateway-side global times, one may always be rounded up and one may always be rounded down, both may always be rounded up or down, or both may be rounded to a nearest instance of a predetermined time increment.

In an authentication session, it may be desirable for the multiple client-side global times to be rounded in the same manner as the multiple gateway-side global times. For example, corresponding synchronized client-side and gateway-side global times may be rounded in the same manner.

As an example, assume a predetermined gap time of 60 seconds separates client-side global times and gateway-side global times. Also assume global time 220a is 9:59:59.9 and global time 222a is 10:00:59.9 while global time 220b is 10:00:00.1 and global time 10:01.00.1. Where global times are always rounded up to the nearest hour, as one specific example, the client-side global times can be 10:00.00.0 and 11:00.00.0 and the gateway-side global times can be 11:00.00.0 and 11:00.00.0. Therefore, it can be seen that a response generated based on global time 222a may match an expected response generated based on either of global times 220a and 220b, while a response generated based on global time 220a alone may not provide a valid match.

As another example, assume a predetermined gap time of 60 seconds separates client-side global times and gateway-side global times. Also assume global time 220a is 9:29:59.9 and global time 222a is 9:30:59.9 while global time 220b is 9:30:00.1 and global time 9:31.00.1. Where global times are rounded to a nearest hour, as one specific example, the client-side global times can be 9:00.00.0 and 10:00.00.0 and the gateway-side global times can be 10:00.00.0 and 10:00.00.0. Therefore, it can be seen that a response generated based on global time 222a may match an expected response generated based on either of global times 220a and 220b while a response generated based on global time 220a alone may not provide a valid match.

The foregoing examples relate to two client-side global times and corresponding responses and two gateway-side global times and corresponding expected responses. However, it will be appreciated that only one client-side global time and corresponding response or only one gateway-side global time and corresponding expected response may be employed. Furthermore, the values described with respect to the predetermined time increments, predetermined gap times, and synchronization discrepancies are used for clarity of disclosure, but can vary as desired.

With respect to location data, in certain aspects of the present disclosure, an authentication session may comprise a client device receiving location data from a location system. In the authentication session described above with respect to FIG. 3, client device 302 may receive, for example, location data 224 from location system 208. The location data may generally be received at any point during the authentication session prior to generating response 334a and/or response 334b. Furthermore, it may not be necessary for the location data to be received during the authentication session. However, doing so can be an effective approach to utilizing contemporary location data. New location data may be received for each authentication session.

An authentication session may further comprise a security gateway receiving location data. In the authentication session described above with respect to FIG. 3, security gateway 310 may receive, for example, expected location data 226, which has been described above. The expected location data may generally be received at any point prior to the authentication session, and the same expected location data may be employed in multiple authentication sessions with a client device.

As indicated above, whereas location data 224 corresponds to a location of client device 302, expected location data 226, can correspond to an expected location of client device 302. In order for client device 302 to be authenticated, it may be required that location data 224 matches expected location data 226. In this way, client device 302 may have enhanced security against being substantially relocated.

An authentication session may comprise generating a response to an authentication challenge based on the authentication challenge, location data (e.g. global positioning system data) that corresponds to a location of the client device being authenticated, and optionally any other data, such as any of the various types of data described above, including a client device identifier, and a client-side global time. For example, the authentication challenge can be hashed with, or otherwise combined with a passkey comprising a combination of the location data and/or other data. Thus, in the authentication session described above with respect to FIG. 3, client device 302 can generate response 334a based on authentication challenge 332, global time 220a, and client ID 238, and location data 224, by way of example. Client device 302 can also generate response 334b based on authentication challenge 332, global time 222a, client ID 238, and location data 224. As described previously, only one response may be required in some implementations.

An authentication session may also comprise generating an expected response to an authentication challenge based on the authentication challenge, expected location data that corresponds to an expected location of the client device, and optionally any other data, such as any of the various types of data described above, including a client device identifier and a gateway-side global time. For example, the authentication challenge can be hashed with, or otherwise combined with the gateway-side global time and/or other data. Thus, in the authentication session described above with respect to FIG. 3, security gateway 310 can generate expected response 336a based on authentication challenge 332, global time 220b, client ID 238, and expected location data 226, by way of example. Security gateway 310 can also generate expected response 336b based on authentication challenge 332, global time 222b, client ID 238, and expected location data 226.

Thus, location data may be employed in the challenge/response model to authenticate a client device. If the client device were to be moved, for example, by an unauthorized party, the location of the client device would change. If the change is substantial enough it can be reflected in the location data, such that responses generated by the client device would not match expected responses.

Figure 4:
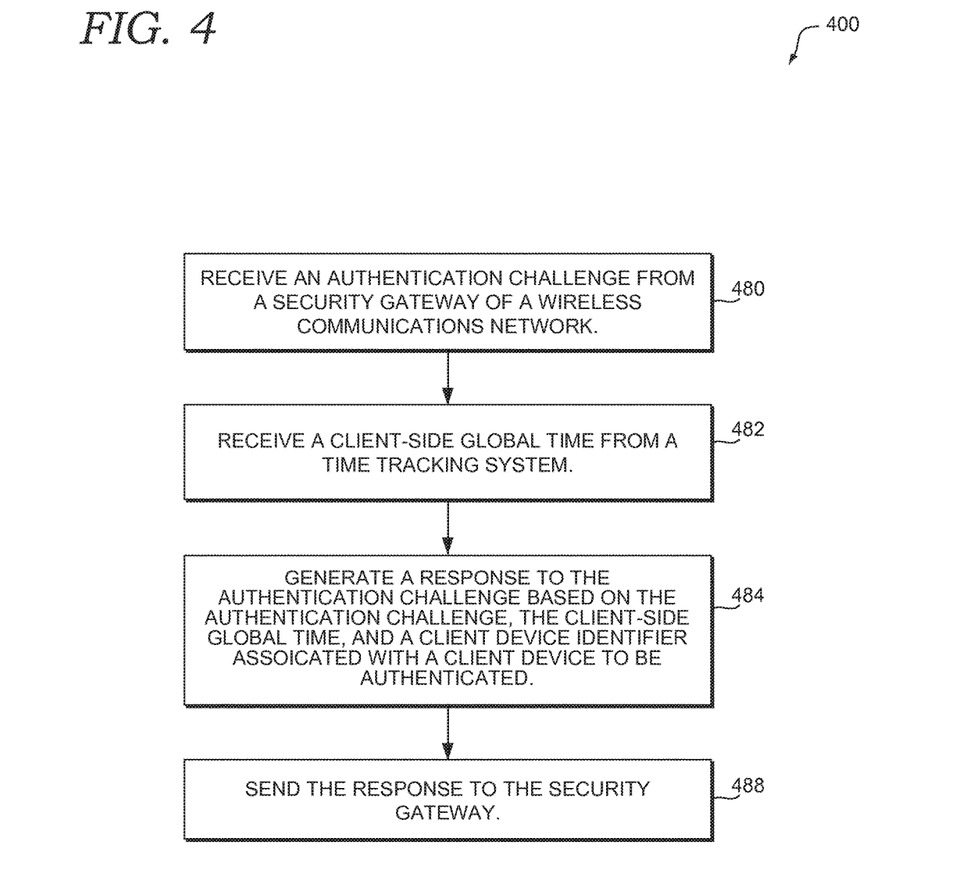
FIG. 4 depicts a flow diagram of an exemplary method for authenticating client devices for communication with one or more wireless communications networks, in accordance with implementations of the present disclosure.

Referring now to FIG. 4, FIG. 4 depicts a flow diagram of an exemplary method 400 for authenticating client devices for communication with one or more wireless communications networks in accordance with implementations of the present disclosure. The method comprises: receiving an authentication challenge from a security gateway of a wireless communications network (block 402), receiving a client-side global time from a time tracking system (block 404), generating a response to the authentication challenge based on the authentication challenge, the client-side global time, and a client device identifier associated with a client device to be authenticated (block 406), and sending the response to the security gateway (block 408). The response to the authentication challenge can optionally be further generated based on location data that corresponds to a location of the client device.

Figure 5:
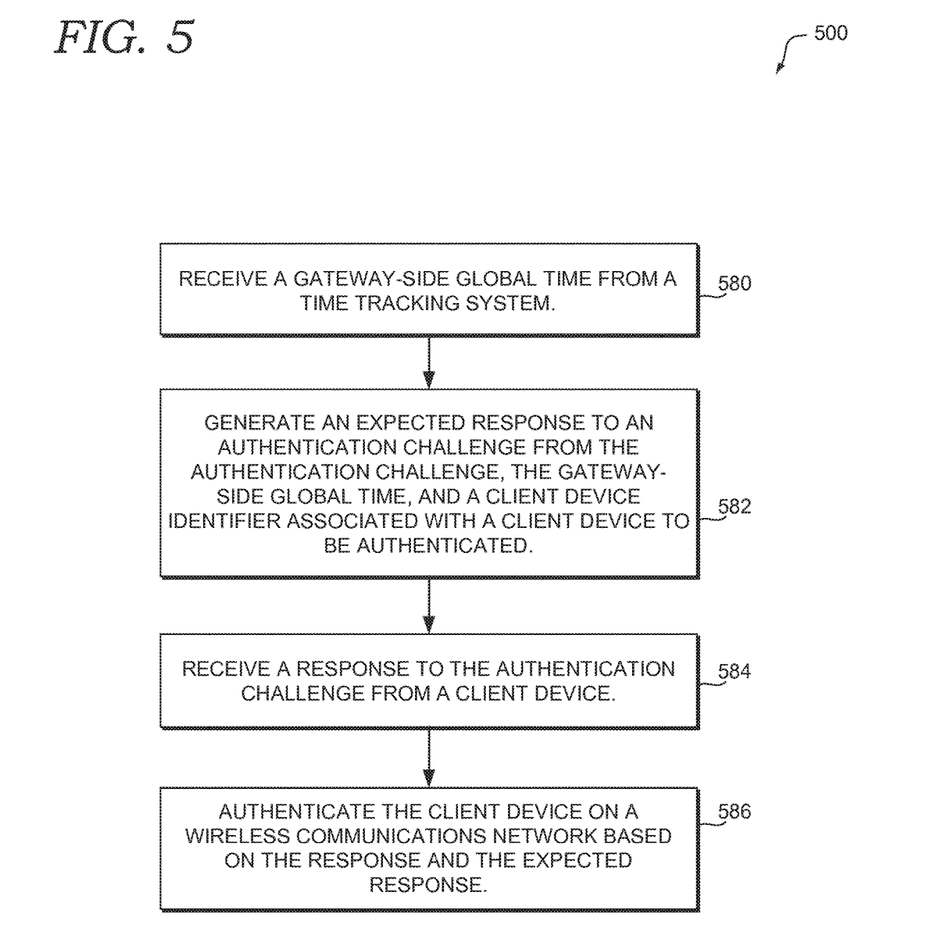
FIG. 5 depicts a flow diagram of an exemplary method for authenticating client devices for communication with one or more wireless communications networks, in accordance with implementations of the present disclosure.

Turning to FIG. 5, a flow diagram is depicted of an exemplary method 500 for authenticating client devices for communication with one or more wireless communications networks in accordance with implementations of the present disclosure. The method comprises: receiving a gateway-side global time from a time tracking system (block 502), generating an expected response to an authentication challenge based on the authentication challenge, the gateway-side global time, and a client device identifier associated with a client device to be authenticated (block 504), receiving a response to the authentication challenge from the client device (block 506), and authenticating the client device on a wireless communications network based on the response and the expected response (block 508). The expected response to the authentication challenge can optionally be further generated based on location data that corresponds to an expected location of the client device.

Thus, in accordance with implementations of the present disclosure, client devices and/or users can be authenticated for communication with secured networks utilizing any of various combinations of the approaches described herein. These approaches may be especially suitable for authentication of small cells, such as femtocells, but are not limited thereto.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for authenticating client devices for communication with one or more wireless communications networks, the system comprising:
 a time tracking system; and
 a security gateway comprising a processor and a non-transitory computer storage medium storing computer-useable instructions that, when used by the processor, cause the processor to:
  receive at least one gateway global time from the time tracking system, the gateway global time being synchronized with a client global time;
  provide an authentication challenge to the client device, the authentication challenge generated based on the at least one gateway global time and a client device identifier;
  generate an expected response to the authentication challenge based on at least the authentication challenge, the client device identifier, and the client global time;
  receive a response to the authentication challenge, the response generated by the client device; and
  authenticate the client device on a wireless communications network based on comparing the response and the expected response using a matching function.

2. The system of claim 1, wherein the security gateway is further configured to:
 receive another gateway global time from the time tracking system, the gateway global time being synchronized with another client global time; and
 generate another expected response to the authentication challenge based on the authentication challenge, the another gateway global time, and the client device identifier.

3. The system of claim 1, wherein the security gateway is further configured to:
 provide another authentication challenge to the client device, the authentication challenge generated based at least on another received gateway global time and the client identifier;
 receive another response to the authentication challenge, the response generated by the client device based on the client global time.

4. The system of claim 1, wherein the security gateway is configured to round the gateway-side global time to a predetermined time increment to generate the expected response to the authentication challenge.

5. The system of claim 1, wherein the security gateway generates the expected response to the authentication challenge based further on received expected location data corresponding to an expected location of the client device.

6. The system of claim 1, wherein the security gateway receives a response to the authentication challenge based further on location data that corresponds to a location of the client device.

7. The system of claim 1, wherein the client device identifier comprises a media access control (MAC) address of the client device.

8. One or more non-transitory computer-readable media having computer-executable instructions embodied thereon that, when executed, perform a method for authenticating client devices for communication with one or more wireless communications networks, the method comprising:
 receiving, by a security gateway of a wireless communications network, a gateway global time from a time tracking system, the gateway global time being synchronized with a client global time;
 providing an authentication challenge to a client device based at least on the gateway global time and a client device identifier;
 generating an expected response to the authentication challenge based on the authentication challenge, the gateway global time, and the client device identifier associated with a client device to be authenticated; and
 receiving an authentication response by the security gateway from the client device; and
 authenticating the client device on a wireless communications network by comparing the expected response and the authentication response using a matching function.

9. The one or more computer-readable media of claim 8, wherein the generating the expected response to the authentication challenge comprises rounding the gateway global time to a predetermined time increment.

10. The one or more computer-readable media of claim 8, wherein the received authentication response is based on the client global time, the client global time being rounded to a nearest instance of a predetermined time increment to the client global time.

11. The one or more computer-readable media of claim 8, wherein the method comprises:
 receiving another gateway global time from the time tracking system;
 providing another authentication challenge to a client device based at least on the another gateway global time generating another expected response to the authentication challenge based on the another authentication challenge, the another gateway global time, and the client device identifier; and receiving another authentication response from the client device.

12. The one or more computer-readable media of claim 8, wherein the received authentication response comprises a hash of the authentication challenge with a passkey, the passkey being a combination of the client global time and the client device identifier.

13. The one or more computer-readable media of claim 8, wherein the method comprises enabling communication between an authenticated client device and the wireless communications network.

14. The one or more computer-readable media of claim 8, wherein the generating at least one of the authentication challenge and the expected response to the authentication challenge is based further on location data corresponding to the client device.

15. The one or more computer-readable media of claim 8, wherein the client device comprises a femtocell.

16. A method for authenticating client devices for communication with one or more wireless communications networks, the method comprising:

receiving a first set of expected location data from a location system, the expected location data corresponding to a client device to be authenticated;

receiving a gateway global time from a time tracking system;

generating an expected response to an authentication challenge based on a generated authentication challenge, the expected location data, the gateway global time, and a client device identifier associated with a client device to be authenticated;

receiving a response to the authentication challenge from the client device; and authenticating the client device on a wireless communications network based on the response and the expected response utilizing a matching function.

17. The method of claim 16, wherein the generating the expected response further comprises:

rounding the gateway global time to a predetermined time increment.

18. The method of claim 17, wherein the generating the expected response comprises rounding the gateway global time to a nearest instance of a predetermined time increment to the gateway global time.

19. The method of claim 16, further comprising:

receiving a second set of expected location data; and generating a second expected response to the authentication challenge based on the authentication challenge, the second set of expected location data, and the client device identifier.

20. The method of claim 19, wherein the authenticating the client device on the wireless communications network comprises:

comparing the response to the expected response and the second expected response; and determining that the response matches at least one of the expected response and the second expected response.

* * * * *